No. 751,712. Patented February 9, 1904.

UNITED STATES PATENT OFFICE.

VICTOR BERMONT, OF PARIS, FRANCE.

PROCESS OF PRODUCING HYDRATED SULFID OF ZINC.

SPECIFICATION forming part of Letters Patent No. 751,712, dated February 9, 1904.

Application filed May 6, 1902. Serial No. 106,183. (No specimens.)

*To all whom it may concern:*

Be it known that I, VICTOR BERMONT, a citizen of Switzerland, residing in Paris, France, have invented a certain new and useful Improved Industrial Process for the Direct Extraction of the Zinc Contained in the Oxygen-Bearing Compounds, (for which I have obtained a patent in France, No. 315,888, bearing date November 13, 1901, and in Great Britain, No. 6,752, bearing date March 19, 1902,) of which the following is a specification.

This invention has for its object an industrial process for the direct extraction in the form of chemically-pure zinc salts (sulfid, oxysulfid, oxid, carbonate, and the like) of the zinc contained in oxid, carbonate, sulfate, phosphate, arsenate, silicate, and the like ores, and more particularly in smithsonite ($Zn.CO_3$) and calamine, ($H_2Zn_2SiO_5$.)

It is well known that the oxygen-bearing salts of zinc are soluble in ammonia and its compounds. On the other hand, it is known that the salts of zinc and allied metals in solution in presence of a sulfid soluble in water yield sulfid precipitates. It is admitted that sulfid of zinc must be formed the first, its heat of formation being greater than that of the sulfids of the allied metals. In reality they are formed almost simultaneously, and even when little soluble sulfid is added to the ammoniacal solution the nascent sulfid of zinc is decomposed and the sulfids of iron, copper, and the like are deposited alone, or almost alone. These various properties, utilized industrially by the recovery of the ammonia and reconstitution of the soluble sulfid, constitute the improved process which forms the object of my invention.

In order to allow of my invention being better understood, I will now describe the application of the process to the treatment of smithsonite by the sulfid of sodium.

The zinc ore is first crushed by any suitable apparatus—such as stamping-mills, cylinder-crushers, ball-crushers, and the like—so as to reduce it into grains of such a size that a rapid contact and intimate penetration of the ammonia can easily take place. The best size of the grain will evidently depend on the nature of the ore and the greater or lesser porosity of the gangue which surrounds the zinc salt, and this will determine the choice of crushing apparatus. The mineral thus crushed is then treated with liquid ammonia (preferably in a closed vessel to avoid losses) either by maceration or by continuous soakings or by methodic soakings with or without mashing of the mass. The zinc salt ($Zn.CO_3$) in this particular case, as well as the small quantities of soluble salts of the other metals, dissolves in the ammonia, and the ore divides into two parts—first, an aqueous ammoniacal solution containing the dissolved salts, (zinc and other metals;) second, a sandy or muddy mass containing all the undissolved portions of the ore. I separate these two parts by filtration after decantation. I wash the solid part to remove the ammonia with which it may remain impregnated and the soluble salts of zinc which it has thus retained in order to exhaust it completely and only to throw away the really insoluble substance. The decantation and the filtration may be effected in any suitable manner, but preferably in a closed vessel. To the ammoniacal solution containing a large quantity of zinc salt and small quantities of iron, copper, &c., will be added gradually the solution of sulfid until the nascent zinc sulfid is no longer decomposed by the salts of the other metals and it precipitates and remains white. Then the addition of the soluble sulfid will be stopped and the liquid filtered, the impurities remaining in the filter and a clear liquid being secured which contains only salts of zinc—that is to say, that it contains as precipitable salts only salts of zinc. In effect the liquid may besides contain the metal of the added soluble sulfid, according as this last metal gives or not an insoluble salt. Thus by using barium sulfid insoluble barium carbonate is obtained, whereas by using sodium sulfid sodium carbonate is obtained, which remains dissolved in the liquid; but this sodium carbonate will not precipitate with the salt of zinc contained in the liquid, which salt will precipitate alone. It is understood, therefore, that the liquid effectively contains as precipitable salts only salts of zinc. The liquor thus purified serves as basis for the separation of perfectly pure salts of zinc. Its treatment differs according to the salt which it is desired to obtain.

In order to obtain perfectly pure carbonate of zinc, it is sufficient to evaporate the ammonia, which is recovered in the condensing apparatus for another operation.

In order to obtain perfectly pure oxid, it is sufficient to roast the carbonate.

In order to obtain perfectly pure sulfid of zinc, a soluble sulfid (in the present instance sulfid of sodium) is added to the liquor, and the sulfid of zinc is precipitated, leaving carbonate of soda in solution.

In short, the salt of zinc is always prepared by a precipitation which is obtained either by adding to the liquid a soluble salt giving an insoluble salt of zinc, or by eliminating the dissolvent.

The part of ore which is insoluble in the ammonia is subjected to the influence of a vacuum and heat in order to expel all the ammonia which may have remained in its pores and which is recovered in a condensing apparatus. The entirely freed ammonia part thus obtained is subjected to a mechanical treatment in order to recover the allied metals or it is rejected as waste.

It may here be pointed out that the whole of the ammonia is thus recovered and that consequently none is consumed in the manufacture, this being the agent of conveyance, which remains intact.

I declare that what I claim is—

A process for the preparation of pure zinc salts from the oxygen-bearing compounds, consisting in treating by ammonia the ore previously crushed and in separating by filtration, after decantation, the solution from the solid part; purifying the ammoniacal liquor produced, consisting in precipitating the metals other than zinc in the condition of insoluble sulfids formed when soluble sulfid is gradually added to the first solution, in separating by filtration, after decantation, these precipitates from the liquid mass so as to obtain as precipitable salts only zinc salts, and in precipitating from this solution perfectly pure salts of zinc by the addition of soluble salt giving an insoluble salt of zinc; substantially as set forth.

In witness whereof I have hereunto set my hand in presence of two witnesses.

VICTOR BERMONT.

Witnesses:
 EDWARD P. MACLEAN,
 EUGÉNE PICHON.